United States Patent
Dyke

Patent Number: 6,054,050
Date of Patent: Apr. 25, 2000

[54] PROCESS FOR REMOVING ORGANIC AND INORGANIC CONTAMINANTS FROM REFINERY WASTEWATER STREAMS EMPLOYING ULTRAFILTRATION AND REVERSE OSMOSIS

[75] Inventor: Charles A. Dyke, Glenham, N.Y.

[73] Assignee: Texaco Inc., White Plains, N.Y.

[21] Appl. No.: 09/120,089

[22] Filed: Jul. 21, 1998

[51] Int. Cl.[7] ................................. B01D 61/58
[52] U.S. Cl. .................. 210/639; 210/641; 210/650; 210/652; 210/669; 210/774; 210/791; 210/806
[58] Field of Search ................... 210/639, 641, 210/650, 651, 652, 654, 663, 669, 687, 799, 806, 774, 175, 409, 791, 797, 275, 792, 794; 208/179, 187; 203/10, 14

[56] References Cited

U.S. PATENT DOCUMENTS

| | | | |
|---|---|---|---|
| 5,174,901 | 12/1992 | Smith | 210/806 |
| 5,227,071 | 7/1993 | Torline et al. | 210/806 |
| 5,250,185 | 10/1993 | Tao et al. | 210/654 |
| 5,376,262 | 12/1994 | Perry | 210/651 |
| 5,558,775 | 9/1996 | Busch | 210/641 |
| 5,783,084 | 7/1998 | Suenkonis | 210/774 |
| 5,807,486 | 9/1998 | Busch | 210/641 |

Primary Examiner—Joseph W. Drodge
Attorney, Agent, or Firm—Harold J. Delhommer; Dilworth & Barrese

[57] ABSTRACT

A process for removing soluble and insoluble organic and inorganic contaminants from refinery wastewater streams employing ultrafiltration and reverse osmosis is provided. Permeate from the ultrafiltration step is first passed through a sequential softening system to remove divalent and trivalent metal cations prior to being passed to the reverse osmosis step to prevent fouling therein.

19 Claims, 1 Drawing Sheet

PROCESS FOR REMOVING ORGANIC AND INORGANIC CONTAMINANTS FROM REFINERY WASTEWATER STREAMS EMPLOYING ULTRAFILTRATION AND REVERSE OSMOSIS

BACKGROUND OF THE INVENTION

This invention relates to a process for removing organic and inorganic contaminants from refinery wastewater streams. More particularly, this invention is directed to a process for removing soluble organic and inorganic contaminants and insoluble organic and inorganic contaminants from refinery wastewater streams employing ultrafiltration and reverse osmosis.

Refinery wastewater streams typically contain many regulated inorganic and organic contaminants that can restrict its use or disposal thereof. Standards promulgated by federal and state agencies that regulate the maximum content of contaminants in wastewater streams disposed into publicly owned treatment works or discharged into waste injection wells have become increasingly more strict. Thus, processes for reducing the content of the inorganic and organic contaminants to an acceptable level in the wastewater streams have been employed to comply with these standards.

For example, U.S. Pat. No. 5,250,185 discloses a method of treating an aqueous charge liquid, e.g., oilfield produced waters, that contains boron and solubilized hydrocarbon compounds to substantially reduce the boron concentration in the liquid. The method involves (1) adding a water softener to the aqueous charge liquid to remove all divalent cations from the liquid; (2) raising the pH of the liquid to above 9.5 and (3) passing the liquid into contact with the high pressure side of a reverse osmosis membrane to recover from the lower pressure side of the membrane the aqueous charged liquid reduced in boron concentration.

Another example is U.S. Pat. No. 5,376,262 which discloses a process to reduce the concentration of inorganic contaminants in a refinery wastewater stream employing reverse osmosis.

SUMMARY OF THE INVENTION

In accordance with the present invention, a process for treating a refinery wastewater stream containing soluble and insoluble organic and inorganic contaminants including divalent and trivalent metal cations to reduce the concentration of contaminants present therein which comprises:

a) passing the refinery wastewater stream into contact with the high pressure side of an ultrafiltration membrane to remove insoluble contaminants present therein and recover from the low pressure side of the ultrafiltration membrane an ultrafiltration permeate;

b) passing the ultrafiltration permeate through a sequential softening system to remove divalent and trivalent metal cations present therein and provide a reverse osmosis feedwater;

c) subjecting the reverse osmosis feedwater to a pH adjustment to stabilize the solubility of the soluble organic contaminants and provide a pH adjusted reverse osmosis feedwater; and, d) passing the pH adjusted reverse osmosis feedwater into contact with the high pressure side of a reverse osmosis membrane to remove soluble contaminants present therein and recover from the low pressure side of the reverse osmosis membrane a reverse osmosis permeate having a reduced concentration of soluble and insoluble organic and inorganic contaminants.

The sequential use of ultrafiltration and reverse osmosis membranes accompanied by an appropriate pH adjustment in accordance with the foregoing process provides a refinery wastewater stream possessing significantly reduced levels of soluble and insoluble contaminants of all types encountered in refinery operations.

DESCRIPTION OF THE PREFERRED EMBODIMENTS

Figure 1:
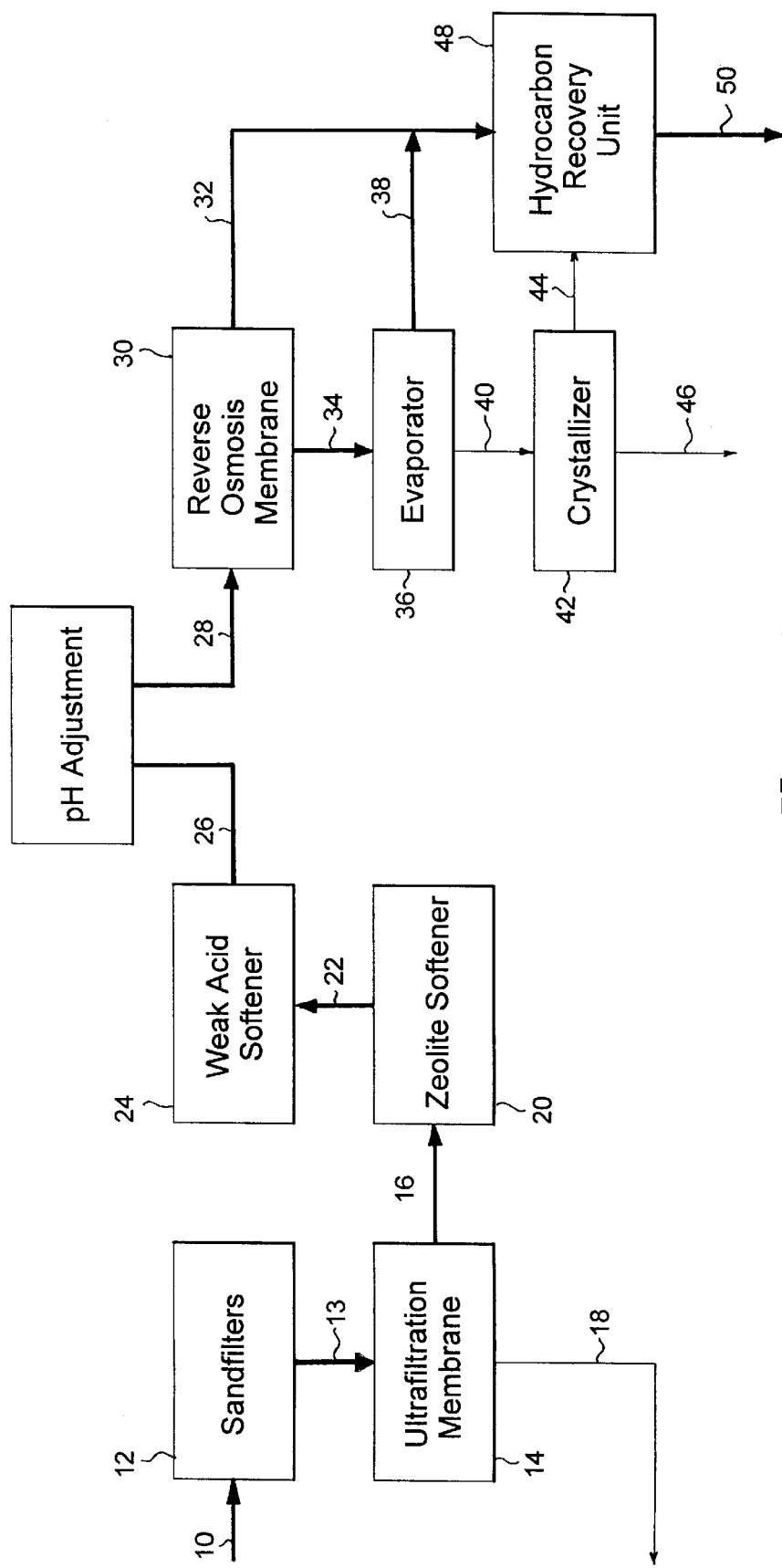
FIG. 1 is a flowchart showing the process of this invention.

With reference to FIG. 1, refinery wastewater stream 10 of this invention will typically contain organic and inorganic contaminants. Generally, organic contaminants can be dissolved and emulsified hydrocarbons such as benzene, ethylbenzene, toluene, xylene, phenol and the like. The inorganic contaminants can be salts such as sodium chloride, sodium sulfate, calcium chloride, calcium carbonate, calcium phosphate, barium chloride, barium sulfate and the like, gases such as hydrogen sulfide, ammonium and the like, metals such as copper, nickel, lead, zinc, arsenic, tantalum, selenium, fluorine, molybdenum, barium, iron, cobalt, tungsten, cadminium, strontium, vanadium, magnesium, chromium, mercury, boron and the like and oxides. The organic and inorganic contaminants will ordinarily be in soluble and insoluble form.

As one skilled in the art will readily appreciate, large contaminants and/or oil droplets, if any, can be removed from the refinery wastewater stream 10 prior to subjecting the wastewater stream 10 to the process described herein employing, for example, a sandfilter. The use of sandfilters are well known in the art. In general, the wastewater stream 10 will pass through sandfilter(s) 12 to remove any of the contaminants and/or droplets present therein of at least 1 micron in size to provide a filtered wastewater stream 13. The sandfilter can be advantageously cleaned by periodically employing a backwashing fluid to readily loosen and solubilize any trapped contaminants and/or oil droplets from the sandfilter's sandbeds. It is particularly advantageous to use the reverse osmosis permeate, which is discussed below, as the backwashing fluid since it has a high pH, e.g., a pH greater than 9, and will typically result a thorough cleaning of the sand beds. The sandfilter can then continue to operate with a typically low sand bed pressure drop.

Following the filtering of the large contaminants and/or oil droplets, if any, from the refinery wastewater stream 10, the filtered wastewater stream 13 is passed into contact with the high pressure side of ultrafiltration membrane 14 to remove any insoluble contaminants present therein and recover from the low pressure side of the ultrafiltration membrane 14 an ultrafiltration permeate 16 and from the high pressure side of membrane 14 an ultrafiltration retentate 18. The ultrafiltration membrane 14 can be obtained employing methods known in the art. A useful material for forming the membrane 14 is a polyacrylonitrile. Preferred ultrafiltration membranes formed from a polyacrylonitrile for use herein are available by Membrex, Inc. (Fairfield, N.J.). The ultrafiltration membrane 14 is ordinarily a hydrophilic membrane, i.e., a membrane having an affinity for water. The molecular weight cutoff of the ultrafiltration membrane 14 will ordinarily range from about 5,000 to about 100,000 and preferably from about 25,000 to about 50,000.

The ultrafiltration membrane 14 can be formed into any suitable configuration such as a flat sheet, hollow fiber and the like. As one skilled in the art will readily appreciate, the flat sheet can be further formed into a configuration such as a spiral wound module or a plate-and-frame. A preferred configuration for use herein is a spiral wound module. The ultrafiltration membrane 14 possessing a spiral wound module configuration can have a diameter of about 4 inches to about 8 inches and a length of about 40 inches to about 60 inches. The ultrafiltration membrane 14 used herein will ordinarily process from about 2 to about 8 gallons per minute of the filtered wastewater stream 13 and preferably from about 4 to about 6 gallons per minute of the filtered wastewater stream 13. A full scale operation can use multiple ultrafiltration membranes. The pressure differential maintained across the ultrafiltration membrane 14 will ordinarily range from about 10 to about 100 psig and preferably from about 30 to about 90 psig.

The ultrafiltration permeate 16 recovered from the low pressure side of the ultrafiltration membrane 14 is reduced in concentration of insoluble organic and inorganic contaminants. In general, the concentration of insoluble organic contaminants can be, for example, less than about 100 ppm and preferably less than about 10 ppm. The concentration of insoluble inorganic contaminants can be, for example, less than about 100 ppm and preferably less than about 10 ppm. The turbidity of the ultrafiltration permeate 16 will ordinarily be less than about 10 NTU and preferably less than about 0.5 NTU. The percentage of the refinery wastewater stream 10 recovered as the ultrafiltration permeate 16 will ordinarily range from about 90 to about 99% and preferably from about 95 to about 99%.

The ultrafiltration retentate 18 recovered from the high pressure side of the ultrafiltration membrane 14 is typically greater in concentration of insoluble organic and inorganic contaminants. Generally, the ultrafiltration retentate 18 can be recycled back to refinery wastewater holding tanks which are ordinarily located at the front end of conventional refinery wastewater treatment systems.

Upon recovering the ultrafiltration permeate 16 from the low pressure side of the ultrafiltration membrane 14, it is necessary to remove any divalent cations, e.g., barium, calcium, iron, magnesium and the like, and/or trivalent cations present in the ultrafiltration permeate 16. It is especially advantageous to remove any calcium and magnesium cations present therein so that when, as described below, the pH adjusted reverse osmosis feedwater is passed through the reverse osmosis membrane, the calcium-based and magnesium-based mineral scales do not precipitate on and foul the reverse osmosis membrane. Zeolite softeners, weak acid softeners, organic chelating agents such as ethylenediamine tetraacetic acid (EDTA), combinations thereof, or other softening procedures can be used to remove the divalent and/or trivalent cations. A preferred procedure for use herein is a sequential softening system of a conventional zeolite softener followed by a weak acid softener. Scale inhibitors can also be added to further reduce the possibility of scaling.

In general, the ultrafiltration permeate 16 is first passed through zeolite softener 20 to remove any divalent and/or trivalent cations present therein to provide a zeolite softener effluent 22. Suitable zeolite softeners that can be used herein are well known to one skilled in the art such as those available from Rohm & Haas. The concentration level of divalent and/or trivalent cations typically reached when processing the ultrafiltration permeate 16 can vary, and, e.g., in the case of calcium can range down to a level of less than about 10 mg/L to less than about 1.5 mg/L and in the case of magnesium can range down to a level of less than about 2.0 mg/L to less than about 0.1 mg/L.

The zeolite softener effluent 22 is then passed through weak acid softener 24 to remove any remaining residual divalent and/or trivalent cations present therein and provide a reverse osmosis feedwater 26. Suitable weak acid softeners can be any commercially available weak acid softener known to one skilled in the art such as those available from U.S. Filter. In general, the concentration level to which the divalent and/or trivalent cations are reduced in the reverse osmosis feedwater 26 can vary, and, e.g., in the case of calcium can range to a level of less than about 1.0 mg/L to less than about 0.05 mg/L and in the case of magnesium can range to a level of less than about 0.5 mg/L to less than about 0.01 mg/L.

The remaining soluble organic contaminants present in the reverse osmosis feedwater 26 will typically result in the fouling of the reverse osmosis membrane, as described below, when the reverse osmosis feedwater 26 is passed through the reverse osmosis membrane. Accordingly, it is necessary to adjust the pH level of the reverse osmosis feedwater 26, e.g., to a pH level ranging from about 9.5 to about 14, preferably from about 10 to about 12 and more preferably from about 10.5 to about 11, to stabilize the soluble organic contaminants and provide a pH adjusted reverse osmosis feedwater 28. The pH of the reverse osmosis feedwater 26 can be adjusted by the addition of hydroxides of alkali metals, such as, for example, sodium hydroxide, into the reverse osmosis feedwater 26. Sodium hydroxide is preferred for use herein. The amount of sodium hydroxide necessary to adjust the pH to its desired level can vary depending on the ionic balance of the water, i.e., the concentration of cations in the water and particularly the dissociated organic cations. Generally, the amount of sodium hydroxide added will range from about 0.001 to about 0.1 pound per gallon of the reverse osmosis feedwater 26.

The pH adjusted reverse osmosis feedwater 28 is then passed into contact with the high pressure side of reverse osmosis membrane 30 to remove any soluble contaminants present therein and recover from the low pressure side of the reverse osmosis membrane 30 a reverse osmosis permeate 32 and from the high pressure side of the membrane 30 a reverse osmosis retentate 34. The reverse osmosis membrane 30 of this invention can be obtained employing methods known in the art. The membrane 28 can be a thin film composite membrane possessing a relatively thick, nonwoven fabric backing layer, a porous ultrafiltration membrane as an intermediate layer and a dense non-porous polymeric film as a separation layer. The reverse osmosis membrane 30 that can be used herein is commercially available from Desalination Systems, Inc. (Escondido, Calif.). The reverse osmosis membrane 30 will ordinarily have a sodium chloride rejection of 97.5 to 99.9%

In general, the reverse osmosis membrane 30 can be formed into any suitable configuration such as a flat-sheet, hollow fiber and the like, employing known methods. As one skilled in the art will readily appreciate, the flat sheet can be further formed into a configuration such as a spiral wound module or a plate-and-frame system. A preferred configuration for use herein is the spiral wound module. The reverse osmosis membrane 30 possessing a spiral wound module configuration used herein will ordinarily have a diameter of about 8 inches and a length of about 40 inches. The membrane 30 can typically process about 5 gallons/minute of pH adjusted reverse osmosis feedwater 28 at a pressure differential maintained across the membrane 30 from about 200 to about 1000 psig. A full scale operation can use multiple larger membranes having a commercially available diameter of at least about 8 inches and a length of at least about 60 inches. The reverse osmosis membrane 30 at full scale operation can ordinarily process about 7.5 gallons/minute of pH adjusted reverse osmosis feedwater 28 at a pressure differential of from about 200 to about 1000 psig.

The reverse osmosis permeate 32 recovered from the low pressure side of the reverse osmosis membrane 30 is reduced in concentration of soluble organic and inorganic contaminants. However, any non-ionized, soluble organic contaminants still present in the pH adjusted reverse osmosis feedwater 28 having a molecular weight lower than about 150, e.g., benzene, ethylbenzene, toluene, xylene, etc., will partially pass through the membrane 30 and ordinarily will be recovered in the reverse osmosis permeate 32. The concentration of non-ionized, soluble organic and inorganic contaminants still present in the reverse osmosis permeate 32 can vary widely, e.g., the concentration can range from about 5% in the case of xylene to about 100% in the case of ammonia of the concentration in the reverse osmosis feedwater 28. The turbidity of the reverse osmosis permeate 34 will ordinarily be less than about 0.2 NTU and preferably less than about 0.1 NTU. The percentage of the refinery wastewater stream 10 recovered as the reverse osmosis permeate 32 can be from about 70 to about 90 % and preferably from about 75 to about 80% . Generally, this recovery will depend on the concentration of sparingly soluble minerals and organic contaminants still present in the retentate 34 and will decrease as these concentrations increase.

The reverse osmosis retentate 34 recovered from the high pressure side of the reverse osmosis membrane 30 is greater in concentration of soluble organic and inorganic contaminants. The reverse osmosis retentate 34 can optionally be passed through an evaporation system 36 to reduce the concentration of the soluble organic and inorganic contaminants present therein to provide an evaporator distillate 38 and evaporator concentrate 40. Generally, an anti-foaming agent, e.g., Nalco 2300 available from Nalco Chemical Company, can be added to the reverse osmosis retentate 34 in an amount ranging from about 10 to about 500 ppm.

The evaporator concentrate 40 recovered from the evaporation system 36 will typically be greater in concentration of soluble organic and inorganic contaminants that can be recovered in insoluble form and can optionally be fed to crystallizer 42 to further increase the concentration of the insoluble organic and inorganic contaminants present therein and provide a crystallizer water 44 and crystallized solids 46. The crystallizer water 44 can then be combined with the reverse osmosis permeate 32 together with the evaporator distillate 38 and, as discussed below, passed through a hydrocarbon recovery unit. The crystallized solids 46 will be greater in concentration of insoluble organic and inorganic contaminants and is typically disposed of as solid waste.

Optionally, the reverse osmosis permeate 32 can be combined with evaporator distillate 38 together with the crystallizer water 44 and passed through a hydrocarbon recovery unit (HRU) 48 to remove any hydrocarbons, e.g., the low molecular weight soluble organic contaminants, and ammonia still present in the three streams to provide a recovered refinery wastewater stream 50. Since the pH adjusted reverse osmosis feedwater 28 passing through the reverse osmosis membrane 30 is at a high pH level, i.e., greater than 10.0, the ammonia present in the reverse osmosis permeate 32 can exist as ammonia gas. The hydrocarbons and ammonia gas can be easily stripped from the reverse osmosis permeate 32 by, for example, nitrogen or steam.

The recovered refinery wastewater stream 50 will have a reduced concentration of soluble and insoluble contaminants. In general, the recovered refinery wastewater stream 50 will have a concentration of less than about 100 mg/L of soluble organic contaminants and less than about 100 mg/L of soluble inorganic contaminants. Additionally, the recovered refinery wastewater stream 50 will have a concentration of less than about 1.0 mg/L of insoluble organic contaminants and less than about 1.0 mg/L of insoluble inorganic contaminants. The percentage of the refinery wastewater stream 10 recovered as the recovered refinery wastewater stream 50 can be from about 95 to about 99.9% and preferably from about 98 to about 99.9%.

The following example is illustrative of the process of this invention.

EXAMPLE

A demonstration unit which included the process of this invention was set up to process a refinery wastewater stream at Texaco's Bakersfield Refinery (BkP). The goal of the treatment process was to remove organic and inorganic contaminants from the refinery wastewater stream such that the reverse osmosis permeate recovered at the end of the treatment process met or exceeded new standards being proposed at the beginning of the test period for injection into Class V (non-hazardous) disposal wells in California.

The demonstration unit consisted of all the steps used herein except the evaporator system, the crystallizer system, and the hydrocarbon recovery unit. The testing of the evaporator system was done under the direction of the inventor by a contract laboratory from Apr. 29 to May 31, 1996. The hydrocarbon recovery unit was tested at BkP with a raw wastewater equivalent to the filtered wastewater stream described hereinabove, and it is believed that this step would function as well or better when being fed a blend of the reverse osmosis permeate, evaporator distillate and the crystallizer water.

The installation of the demonstration unit and testing was accomplished in stages over the period Feb. 8, 1993 to Apr. 19, 1996. For example, testing of the ultrafiltration membrane unit began on Feb. 8, 1993. More processing steps were added as testing proceeded in stages, until the entire demonstration unit was in place and used to test the process used herein from Aug. 11, 1995 to Apr. 19, 1996. Operating and analytical data was collected during the 80-day demonstration test.

In the demonstration test, the refinery wastewater stream was cooled to about 110° F. and then flowed continuously under its own pressure down through one of two multi-media sandfilters. The sandfilter removed substantial amounts of insoluble organic and inorganic contaminants by the sandfilter's sand bed to provide a filtered wastewater stream. At the end of each 12 hour period of operation, the refinery wastewater stream was diverted to the alternate multi-media sandfilter. The dirty sandfilter was then valved out and cleaned by pumping a portion of the reverse osmosis permeate, which was stored separately for this purpose, upwards through the sand bed, i.e., backwashing, for a period of 15–20 minutes to remove any filtered contaminants trapped on the sand. The dirty backwashing fluid was then pumped back to the refinery's wastewater storage tanks. The total volume of the backwashing fluid used was approximately 5 percent of the flow of the refinery wastewater stream. This procedure was repeated alternately with each filter.

The filtered wastewater stream was then passed through an ultrafiltration membrane unit which removed any remaining insoluble oil droplets and insoluble contaminants still present therein to provide an ultrafiltration permeate reduced in concentration of insoluble oil droplets and insoluble contaminants and an ultrafiltration retentate. The single stage ultrafiltration membrane unit was operated such that between 89 to 92 percent of the incoming filtered wastewater stream was recovered as low turbidity ultrafiltration permeate. The ultrafiltration retentate contained about 10 times the insoluble oil droplets and insoluble contaminant concentration of the filtered wastewater stream and was recycled back to the refinery's wastewater storage tanks. The combined operating practices of the sandfilter units and ultrafiltration membrane unit were optimized such that the turbidity of the ultrafiltration permeate remained below 0.5 NTU (nephelometric turbidity units) at all times. The ultrafiltration membrane unit was cleaned as needed with a commercially-available high pH detergent solution, then by a 200 mg/L solution of chlorine bleach and finally rinsed with the high pH reverse osmosis permeate.

Analyses of the ultrafiltration permeate showed it to be typically at or near saturation with respect to calcium carbonate in its typical pH range of 7.0 to 9.0. A dual zeolite softener system was then used to remove most of the hardness ions, e.g., calcium, magnesium and other divalent cations present in the ultrafiltration permeate to provide a zeolite softener effluent. The calcium level was reduced from an average of 62 mg/L to 1 mg/L or lower. When the calcium level increased to a level above 1.2 mg/L as measured in the zeolite softener effluent, the ultrafiltration permeate was diverted to the alternate zeolite softener and the used zeolite softener was regenerated with a brine of 10% NaCl in high pH reverse osmosis permeate.

The calcium level in the zeolite softener effluent was further reduced to below 0.20 mg/L by passing the zeolite softener effluent through a dual weak-acid (WA) softener system to provide a reverse osmosis feedwater. The WA softener system was employed as a guard bed to remove any calcium still present in the zeolite softener effluent. If not removed, the calcium could have precipitated as calcium carbonate in the pH adjusted reverse osmosis feedwater as it was being concentrated in the reverse osmosis membrane unit at a high pH. The WA softeners were regenerated as needed with 5% HCl and 4% NaOH solutions made with reverse osmosis permeate.

A controlled flow of a 12.5% NaOH (in reverse osmosis permeate) solution was injected into the reverse osmosis feedwater to raise and control the pH at about 10.5 to provide a pH adjusted reverse osmosis feedwater. The amount of NaOH injected into the reverse osmosis feedwater averaged 0.008 pounds of 50% NaOH per 1 gallon of the reverse osmosis feedwater. Operating at this elevated pH greatly increased the solubility of the soluble organic contaminants still remaining in the water, which kept them from precipitating as their concentrations increased when passing through the reverse osmosis membrane unit.

After the pH adjustment, the pH adjusted reverse osmosis feedwater entered the reverse osmosis membrane unit and about 75 percent of the pH adjusted reverse osmosis feedwater was recovered as the reverse osmosis permeate. A small internal recycle stream of reverse osmosis retentate, was diverted back into the feed stream so that the flow of water to the reverse osmosis membrane unit could be kept constant and independent of the reverse osmosis permeate recovered. The reverse osmosis membrane unit was operated at pressures between 590 and 660 psig as required to maintain the desired permeate recovery as the feedwater's temperature and dissolved solids level varied with day-do-day refinery operations.

The recovered reverse osmosis permeate had over 95 percent of its contaminants removed. Specifically, the total dissolved solids were reduced from an average of 1240 to an average of 98 mg/L, total organic carbon was reduced from 253 to 11 mg/L, selenium was reduced from 0.8 to 0.008 mg/L, molybdenum was reduced from 0.46 to less than 0.01 mg/L, total sulfides were reduced from 42 to 0.4 mg/L and sulfates were reduced from 95 to less than 2.0 mg/L.

Operation at a pH of 10.5 without mineral scaling was possible due to the removal of the divalent cations by the sequential softener system. At this pH, silica solubility is known to increase slightly. However, as a precaution, an Argo Scientific Hypersperce Silica scale inhibitor was injected into the reverse osmosis feedwater, at about 5 parts per million parts feedwater to prevent possible silica scaling of the reverse osmosis membrane unit. The reverse osmosis unit was cleaned periodically with a commercially-available high pH membrane cleaning solution, followed by a rinse with reverse osmosis permeate.

Large samples of the reverse osmosis retentate were collected and sent to the contract lab to test the evaporation system. With injection of a small amount of NaOH to maintain a pH above 11.0 and keep the organic contaminants in solution, and using Nalco 2300 to control foaming, the reverse osmosis retentate was evaporated and further concentrated by a factor of 18 with no scaling problems.

What is claimed is:

1. A process for treating a refinery wastewater stream containing soluble and insoluble organic and inorganic contaminants including divalent and trivalent metal cations to reduce the concentration of contaminants present therein which comprises:

a) passing the refinery wastewater stream into contact with the high pressure side of an ultrafiltration membrane to remove insoluble contaminants present therein and recover from the low pressure side of the ultrafiltration membrane an ultrafiltration permeate;

b) passing the ultrafiltration permeate through a sequential softening system to remove divalent and trivalent metal cations present therein and provide a reverse osmosis feedwater;

c) subjecting the reverse osmosis feedwater to a pH adjustment to stabilize the solubility of the soluble organic contaminants and provide a pH adjusted reverse osmosis feedwater; and, d) passing the pH adjusted reverse osmosis feedwater into contact with the high pressure side of a reverse osmosis membrane to remove soluble contaminants present therein and recover from the low pressure side of the reverse osmosis membrane a reverse osmosis permeate having a reduced concentration of soluble and insoluble organic and inorganic contaminants.

2. The process of claim 1 wherein the molecular weight cutoff of the ultrafiltration membrane is about 5,000 to about 100,000.

3. The process of claim 1 wherein the sequential softening system further comprises:

e) passing the ultrafiltration permeate through a zeolite softener to remove divalent and trivalent metal cations present therein to provide a zeolite softener effluent; and, f) passing the zeolite softener effluent through a weak acid softener to remove any remaining divalent and trivalent metal cations present therein to provide the reverse osmosis feedwater.

4. The process of claim 1 wherein the divalent cations are selected from the group consisting of calcium cations and magnesium cations and mixtures thereof.

5. The process of claim 4 wherein the divalent cation concentration is reduced to less than about 1.0 mg/L of calcium and less than about 0.5 mg/L of magnesium.

6. The process of claim 1 wherein the pH of the reverse osmosis feedwater is increased by the addition of sodium hydroxide.

7. The process of claim 6 wherein the sodium hydroxide is added to the reverse osmosis feedwater in an amount of about 0.001 to about 0.1 pound per gallon of the reverse osmosis feedwater.

8. The process of claim 1 wherein the pH of the pH adjusted reverse osmosis feedwater is about 10 to about 14.

9. The process of claim 1 wherein the percent rejection of sodium chloride from the reverse osmosis membrane is about 97.5 to about 99.9%.

10. The process of claim 1 wherein the concentration of the soluble organic contaminants is reduced to less than about 100 mg/L.

11. The process of claim 1 wherein the concentration of the soluble inorganic contaminants is reduced to less than about 100 mg/L.

12. The process of claim 1 wherein the concentration of the insoluble organic contaminants are reduced to less than about 1.0 mg/L.

13. The process of claim 1 wherein the concentration of the insoluble inorganic contaminants are reduced to less than about 1.0 mg/L.

14. The process of claim 1 which further comprises:
g) recovering from the high pressure side of the reverse osmosis membrane a reverse osmosis retentate having a greater concentration of soluble contaminants;
h) passing the reverse osmosis retentate through an evaporation system to provide an evaporator distillate which is reduced in concentration of soluble contaminants and an evaporator concentrate which is greater in concentration of soluble contaminants;
i) passing the evaporator concentrate through a crystallizer to provide a crystallizer water which is reduced in concentration of soluble contaminants; and,
j) combining the reverse osmosis permeate together with the evaporator distillate and the crystallizer water and passing through a hydrocarbon recovery unit to remove any remaining soluble contaminants present therein and provide a recovered refinery wastewater stream having a reduced concentration of soluble and insoluble organic and inorganic contaminants.

15. The process of claim 14 wherein the soluble contaminants are removed in step (j) by nitrogen or steam stripping.

16. The process of claim 14 wherein an anti-foaming agent is added to the reverse osmosis retentate of step (h).

17. The process of claim 1 wherein the refinery wastewater stream is passed through a sandfilter to remove any large contaminants present therein and provide a filtered wastewater stream.

18. The process of claim 17 wherein the large contaminants removed are at least 1 micron in size.

19. The process of claim 17 wherein the sandfilter is cleaned with the reverse osmosis permeate.

* * * * *

UNITED STATES PATENT AND TRADEMARK OFFICE
CERTIFICATE OF CORRECTION

PATENT NO. : 6,054,050
DATED : April 25, 2000
INVENTOR(S) : Charles A. Dyke

It is certified that error appears in the above-identified patent and that said Letters Patent is hereby corrected as shown below:

Column 2, line 44, insert --in-- after "result".

Signed and Sealed this

Seventeenth Day of April, 2001

Attest:

NICHOLAS P. GODICI

Attesting Officer     Acting Director of the United States Patent and Trademark Office